United States Patent
Reddy A V et al.

(10) Patent No.: US 11,734,121 B2
(45) Date of Patent: *Aug. 22, 2023

(54) SYSTEMS AND METHODS TO ACHIEVE EFFECTIVE STREAMING OF DATA BLOCKS IN DATA BACKUPS

(71) Applicant: EMC IP Holding Company LLC, Hopkinton, MA (US)

(72) Inventors: Mahesh Reddy A V, Bangalore (IN); Swaroop Shankar DH, Bangalore (IN); Chetan Battal, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/814,671

(22) Filed: Mar. 10, 2020

(65) Prior Publication Data
US 2021/0286678 A1 Sep. 16, 2021

(51) Int. Cl.
*G06F 11/00* (2006.01)
*G06F 11/14* (2006.01)
*G06F 11/30* (2006.01)

(52) U.S. Cl.
CPC ...... *G06F 11/1451* (2013.01); *G06F 11/1435* (2013.01); *G06F 11/1461* (2013.01); *G06F 11/1464* (2013.01); *G06F 11/1469* (2013.01); *G06F 11/3006* (2013.01)

(58) Field of Classification Search
CPC .......... G06F 11/1451; G06F 11/1435
See application file for complete search history.

(56) References Cited

U.S. PATENT DOCUMENTS

| | | | |
|---|---|---|---|
| 8,032,494 B2 * | 10/2011 | Aalmink | G06F 16/27 707/666 |
| 8,806,281 B1 * | 8/2014 | Dowers, II | G06F 11/328 714/57 |
| 10,210,054 B1 * | 2/2019 | Mehrotra | G06F 16/24578 |
| 10,606,705 B1 * | 3/2020 | Janakiraman | G06F 11/1451 |
| 10,691,543 B2 * | 6/2020 | Harrington | G06F 3/0689 |
| 10,853,372 B1 * | 12/2020 | Mueen | G06F 16/24568 |
| 11,055,016 B2 * | 7/2021 | Appireddygari Venkataramana | G06F 11/1469 |
| 11,294,775 B2 * | 4/2022 | Reddy A V | G06F 3/0604 |
| 2002/0057706 A1 * | 5/2002 | Michiel | H04L 47/623 370/386 |
| 2005/0177767 A1 * | 8/2005 | Furuya | G06F 11/1448 714/13 |
| 2006/0149796 A1 * | 7/2006 | Aalmink | G06F 16/27 |
| 2008/0198752 A1 * | 8/2008 | Fan | H04Q 3/0079 370/238 |
| 2009/0190592 A1 * | 7/2009 | Hsieh | H04L 45/48 370/392 |

(Continued)

*Primary Examiner* — Loan L.T. Truong
(74) *Attorney, Agent, or Firm* — Womble Bond Dickinson (US) LLP

(57) ABSTRACT

Methods and systems for block-level data prioritization during a backup operation are disclosed. According to some embodiments, the method includes extracting a backup data criticality from header information of one or more data blocks. The method further includes based on the extracted backup data criticality, assigning a weighted value corresponding to the backup data criticality. The method further includes for each data block, calculating a Euclidean distance of the data block to a consecutive data block using the weighted value.

14 Claims, 6 Drawing Sheets

(56) References Cited

U.S. PATENT DOCUMENTS

| | | | |
|---|---|---|---|
| 2010/0153421 A1* | 6/2010 | Choi | G06F 16/258 707/758 |
| 2010/0287128 A1* | 11/2010 | Baltatu | G06K 9/6284 706/12 |
| 2014/0052694 A1* | 2/2014 | Dasari | G06F 16/23 707/654 |
| 2014/0181040 A1* | 6/2014 | Montulli | G06F 11/1451 707/652 |
| 2015/0089309 A1* | 3/2015 | Fu | G06F 11/0724 714/57 |
| 2016/0019119 A1* | 1/2016 | Gupta | G06F 11/1461 707/654 |
| 2016/0142333 A1* | 5/2016 | Panchagnula | H04L 47/623 370/412 |
| 2017/0116330 A1* | 4/2017 | He | G06F 16/334 |
| 2017/0339168 A1* | 11/2017 | Balabine | H04L 63/1416 |
| 2018/0101540 A1* | 4/2018 | Stoop | G06F 16/7867 |
| 2019/0073406 A1* | 3/2019 | Xu | G06F 16/2237 |
| 2020/0104167 A1* | 4/2020 | Chen | G06F 11/186 |
| 2020/0159841 A1* | 5/2020 | Tabares | G06F 16/2272 |
| 2020/0336503 A1* | 10/2020 | Xu | H04L 63/1425 |
| 2020/0341642 A1* | 10/2020 | Appireddygari Venkataramana | G06F 11/1461 |
| 2020/0341643 A1* | 10/2020 | Appireddygari Venkataramana | G06F 3/0619 |
| 2021/0117549 A1* | 4/2021 | Mandagere | G06F 21/577 |
| 2021/0125088 A1* | 4/2021 | Matsumoto | G06N 5/04 |
| 2021/0133168 A1* | 5/2021 | Nara | G06F 11/1453 |
| 2021/0271562 A1* | 9/2021 | Reddy A V | G06F 11/1464 |
| 2021/0271571 A1* | 9/2021 | Reddy A V | G06F 11/1461 |

\* cited by examiner

SYSTEMS AND METHODS TO ACHIEVE EFFECTIVE STREAMING OF DATA BLOCKS IN DATA BACKUPS

FIELD OF THE INVENTION

Embodiments of the present invention relate generally to data storage systems. More particularly, embodiments of the invention relate to systems and methods to achieve effective stream of data blocks in data backups.

BACKGROUND

In today's world, a large amount of data is processed on the daily basis. As such, data backup plays a vital role to secure one's data. A backup window is critical in day-to-day backup scenarios. In the backup world, backups are prioritized, for example, as P0 (critical), P1 (high), P2 (medium), and P3 (low). With a block-based backup technology, choosing a priority among data blocks from heterogeneous data sets from source host(s) to a target device is an imperative decision. All of the blocks would be streamed irrespective of their priority to the target device as the block-based backup technology is unable to ascertain a priority among the data blocks to be written to the target device.

Accordingly, this would become critical when recovery point objective (RPO) is addressed. For instance, RPO of certain clients can be marked as P0 even though the block-based backup technology treats all data sets as normal blocks. For customer, RPO factor will come into the picture and they expect P0 backups to be addressed/protected based on priority. Typically, in a time disaster situation if the logic goes by percentage, for example 50% for P0, 30% for P1, and rest for non-critical backups, then the probability of P0 backups being protected is high during the time of disaster scenario.

In a conventional block-based backup (BBB) scenario in large scale enterprises, a backup agent would start creating containers and convert data objects under backup into multiple blocks of a desired size. All of the data blocks from each data object are then streamed to a target device for a write operation. The chronological priority of the heterogeneous data objects that has to undergo a container creation and block conversion is defined with a negligible criticality among the data objects within the source host. Nevertheless, in a multi-host scenario, during backups within a specified backup window, the server policy would define a static and random priority for the multi-host backups to happen, since backing up most critical host in descending order of their priorities is proven to be a costly affair in terms of time consumption and is not appreciable.

Conventionally, a BBB agent services the request based upon the jobs that are scheduled by a predefined priority that has been decided by the backup admin. However, the data blocks that are, in particular, queued for routing to the target device, assuming that multiple heterogeneous data blocks are queued for writing at the same instant of time, are routed for a write operation in a first come first serve basis depending upon the available limitation on the target device's streaming capacity. Because of such BBB model, there could be instances where the critical data is queued until comparatively non-critical data is being written to the target device due to the first come first serve streaming. Consequently, if there is a disaster that occurs during the write operation at the target device, then the critical data would still be in the queue and not written to the target device. Hence, there is possible data loss in case a disaster occurs at the same instant of time at the source host as well.

For example, in a typical backup scenario using a BBB, the end user would employ several jobs that can be scheduled for different kinds of data types. There are jobs that are scheduled for a day that run at the same time and from different hosts. This can be file system data, such as text files from an employee's laptop, Exchange databases having finance records and several virtual machines that are hosting all of the applications. If the data objects are queued and when they are converted into data blocks and routed for the write operation to the target device without considering data criticality, then the first block is served on a first come basis as the last block. Thus, a more critical data set can still be in a wait state until the queue is free to serve the block. In such cases, if the last requested data is a virtual machine data packet for example, then the most critical data hosting all the applications, which has all the finance data as an example, would be waiting until the non-critical data, such as text files of employees, has been written to the data domain. In such instances, if a disaster occurs at the target device or source host, then the data loss occurring would prove costly to the customer.

Unfortunately, in conventional BBB solutions, there is a gap in prioritizing the data at the block level in a source host. As a result, all of the data blocks are streamed onto a target device on a first come first serve basis. Accordingly, if there is a disaster during or before the write operation completes, there can be a resulting data loss that proves costly to the customer. This would also reduce the RPO of the backup application.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
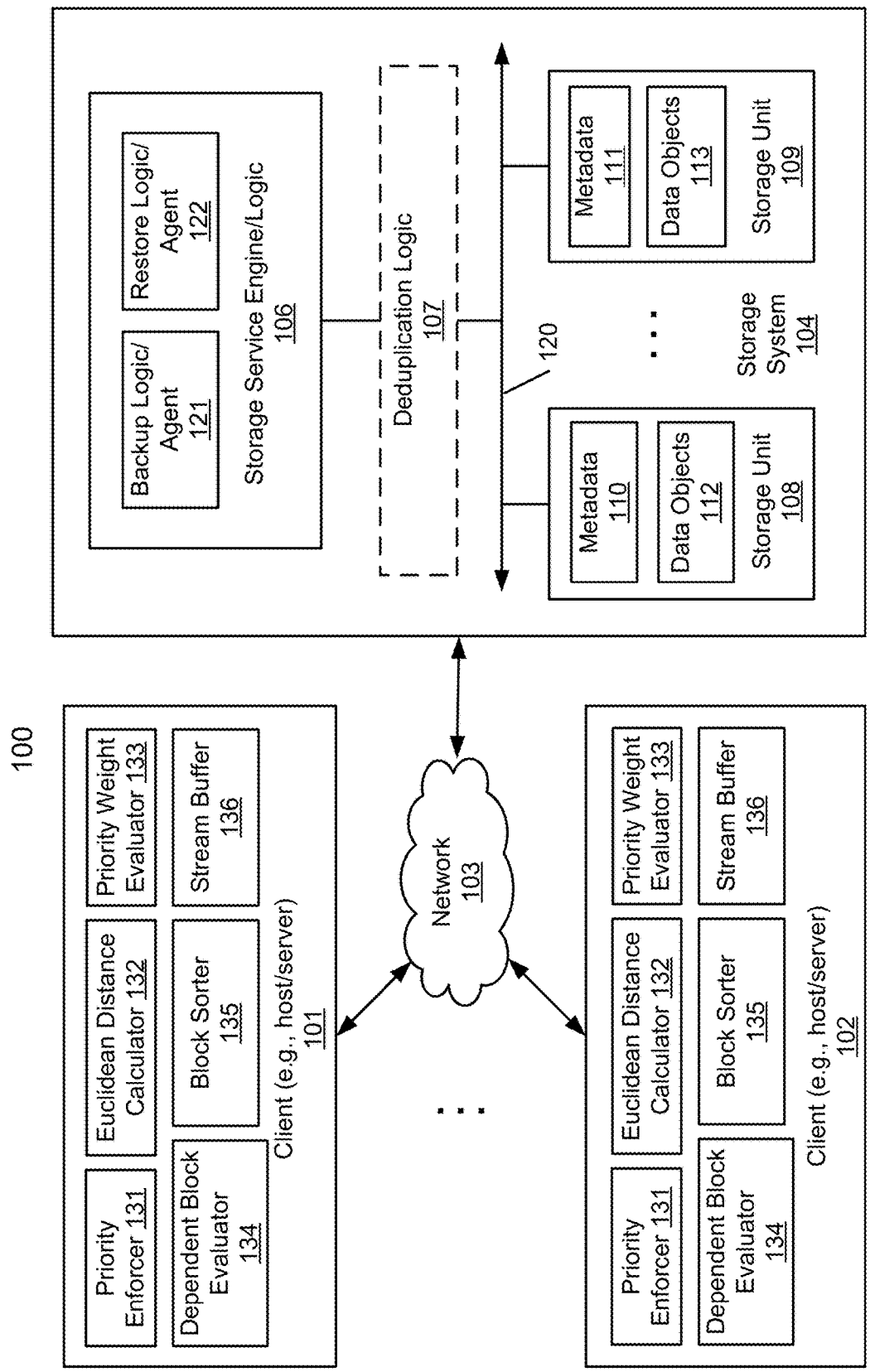
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention disclose a solution that enables block-based backups to prioritize data blocks by considering a data criticality and ensure a better RPO to the customer during disaster situations.

In some embodiments, the solution uses a weighted value proportional to the criticality of the data block. The criticality can be appended in the data block header information by a backup service before converting the data objects into blocks. Also, at the routing data structure (e.g., a queue), a Euclidean distance $E_d$ can be calculated for each of the data blocks in the data structure waiting for a latch permission to get routed onto a target device. Based upon the Euclidean distance, a priority of the data block that needs to be route latched can be decided at the source host.

According to one aspect, a method for block-level data prioritization during a backup operation are described. According to some embodiments, the method includes extracting a backup data criticality from header information of one or more data blocks. The method further includes based on the extracted backup data criticality, assigning a weighted value corresponding to the backup data criticality. The method further includes for each data block, calculating a Euclidean distance of the data block to a consecutive data block using the weighted value.

In one embodiment, prior to extracting the backup data criticality from the header information of the one or more data blocks, the method further includes sniffing data object information of a data object. The data object information may include a data type. The method further includes determining the backup data criticality based on the data object information. The method further includes appending the backup data criticality to the header information of the one or more data blocks. The method may further include evaluating the one or more data blocks to identify at least one dependent data block associated with a parent block, wherein the one or more data blocks comprise the parent block and the at least one dependent data block.

In one embodiment, to calculate the Euclidean distance of the data block to the consecutive data block using the weighted value, the method includes obtaining a dot product of the weighted value and a sequence of the data block in a queue. In one embodiment, the method may further include sorting the one or more data blocks based on the calculated Euclidean distance of each data block. The method may further include routing the sorted one or more data blocks to a stream buffer in a concurrent fashion for streaming operations. To sort the one or more data blocks, the method may include selecting a nearest and most critical data block to be routed for backup based on the calculated Euclidean distance of the nearest and most critical data block to a current data block.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. In one embodiment, clients 101-102 may contain one or more virtual machines (VMs) managed by a virtual machine monitor (VMM) running therein. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

With continued referenced to FIG. 1, each of clients 101-102 may include a priority enforcer 131, a Euclidean distance calculator 132, a priority weight evaluator 133, a dependent block evaluator 134, a block sorter 135 and a stream buffer 136 installed thereon. Priority enforcer 131 is configured sniff data object information (e.g., a data type) of one or more data objects under backup and determine or decide a data criticality (or priority), e.g., high, medium and low, which may be predefined or user calibrated, associated with each data object. For example, if a virtual machine is operating on client 101/102, virtual machine data and application data may be considered as the most critical data and file system data (e.g., text files) may be considered as the least critical data. In one embodiment, the data criticality of the data object and/or the data object information are appended to header information of one or more data blocks (or data packets) converted from each data object.

Based on the header information of each data block (or data packet), priority weight evaluator 133 evaluates the data criticality (or priority) and decides a weight of the data object associated with the data criticality. For example, the data criticality may be determined from a tag that has been added to the header information. In one embodiment, priority weight evaluator 133 assigns a high-level critical value (e.g., 3) to the most critical data, a medium-level critical value (e.g., 2) to medium-level critical data, and a low-level critical value (e.g., 1) to the least critical data. Consequently, dependent block evaluator 134 can evaluate the converted data blocks for any dependent blocks associated with a parent block so that a Euclidean distance can be calculated such that the dependent block can be considered while prioritizing the data blocks for a write (or backup) operation.

Euclidean distance calculator 132 is configured to calculate a Euclidean distance of each data block and its consecutive data block to be backed up. For example, the Euclidean distance may be calculated using a weighted value or weight (assigned by priority weight evaluator 133) to obtain a dot product of a priority and a sequence at a data structure (e.g., a queue) for that particular data block. Based on the calculated Euclidean distance, block sorter 135 is configured to adjust or sort the data blocks in the data structure by selecting a nearest critical data block to be routed onto a target device, such as storage system 104. The sorted data blocks may be routed to stream buffer 136 in a concurrent fashion within available bandwidth for data streaming operations.

Still referring to FIG. 1, storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic or agent 121 is configured to receive and back up or replicate data from a client (e.g., clients 101-102) and to store the backup data in any one or more of storage units 108-109. Restore logic or agent 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
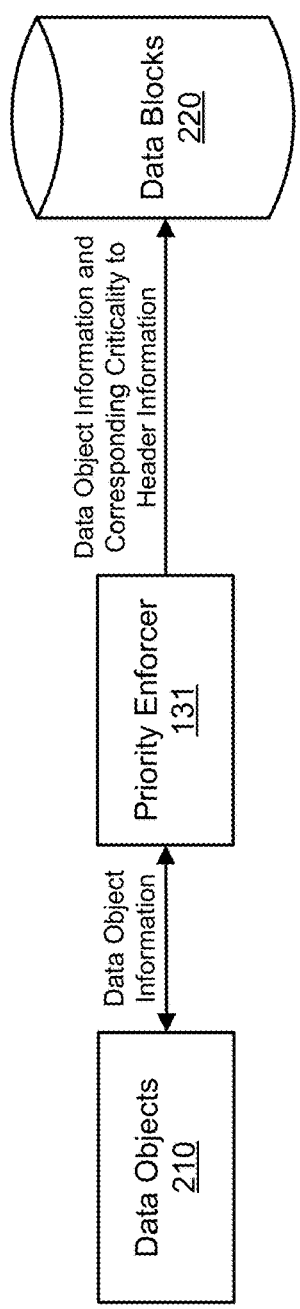
FIG. 2 is a diagram illustrating an example priority enforcer according to one embodiment.

FIG. 2 is a diagram illustrating an example priority enforcer according to one embodiment. Referring to FIG. 2, priority enforcer 131 may sniff or extract data object information (e.g., a data type) of each of data objects 210 to be backed up. Based on the data object information, priority enforcer 131 may determine a data criticality or priority (e.g., high, medium, low) associated with the data object. The data criticality may be predefined or user calibrated. As previously described, virtual machine data and application data, for example, may be considered as the most critical data, whereas file system data (e.g., text files) may be considered as the least critical data. The data object information and/or the corresponding data criticality of the data object may be appended to header information of one or more data blocks 220 converted from the data object.

Figure 3:
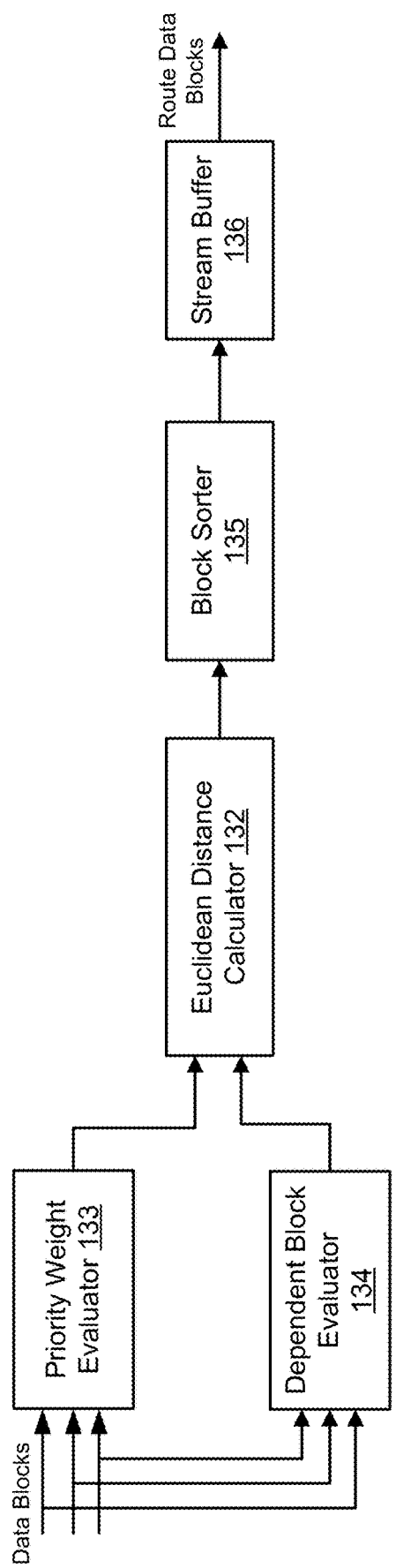
FIG. 3 is a block diagram illustrating a block-level data prioritization system for a block-based backup according to one embodiment.

FIG. 3 is a block diagram illustrating a block-level data prioritization system for a block-based backup according to one embodiment. Referring to FIG. 3, the system includes the priority weight evaluator 133, dependent block evaluator 134, Euclidean distance calculator 132, block sorter 135 and stream buffer 136, as previously described. At each of clients 101-102, priority weight evaluator 133 may evaluate information of the appended data criticality (e.g., a tag that has been previously added) within the header information of each of the data blocks (e.g., data blocks 220 of FIG. 2). For example, priority weight evaluator 133 may extract the data criticality from the header information and based on the extracted data criticality, evaluator 133 may assign a corresponding weight or weighted value. As previously described, a weighted value of 3 may represent the most critical data, a value of 2 may represent medium critical data, and a value of 1 may represent the least critical data, though any values can be used to represent the data criticality.

In one embodiment, dependent block evaluator 134 evaluates the converted data blocks to determine or identify dependent blocks associated with a parent block so that a minimum Euclidean distance can be calculated such that the dependent blocks can be considered while prioritizing the data blocks for a write operation.

Euclidean distance calculator 132 may calculate a Euclidean distance of each data block and each consecutive block, for example in a queue. The Euclidean distance calculation may be modified using the weighted value assigned by evaluator 133 in order to obtain a dot product of a priority and a sequence in a data structure (e.g., a queue) for the data block. In this way, the nearest and most critical data block (e.g., high-level criticality) can be evaluated with respect to a current data block to be route latched first to a target device (e.g., storage system 104 of FIG. 1). After this iteration of the Euclidean distance calculation, bandwidth can be allocated according to the nearest and most critical data blocks for a write operation.

For instance, once the Euclidean distance of each data block to be backed up (with its consecutive data block in the data structure in all available blocks) have been calculated at a particular point in time, block sorter 135 may adjust (or sort) the data blocks in the data structure. For example, block sorter 135 may select the nearest and most critical data block to be routed onto a target device (e.g., storage system 104 of FIG. 1) based on the calculated Euclidean distance of each data block. The adjusted or sorted data blocks may be routed to stream buffer 136 in a concurrent fashion within available bandwidth for streaming operations. The stream buffer 136 may further route the adjusted data blocks to be route latched and written to the target device.

Figure 4:
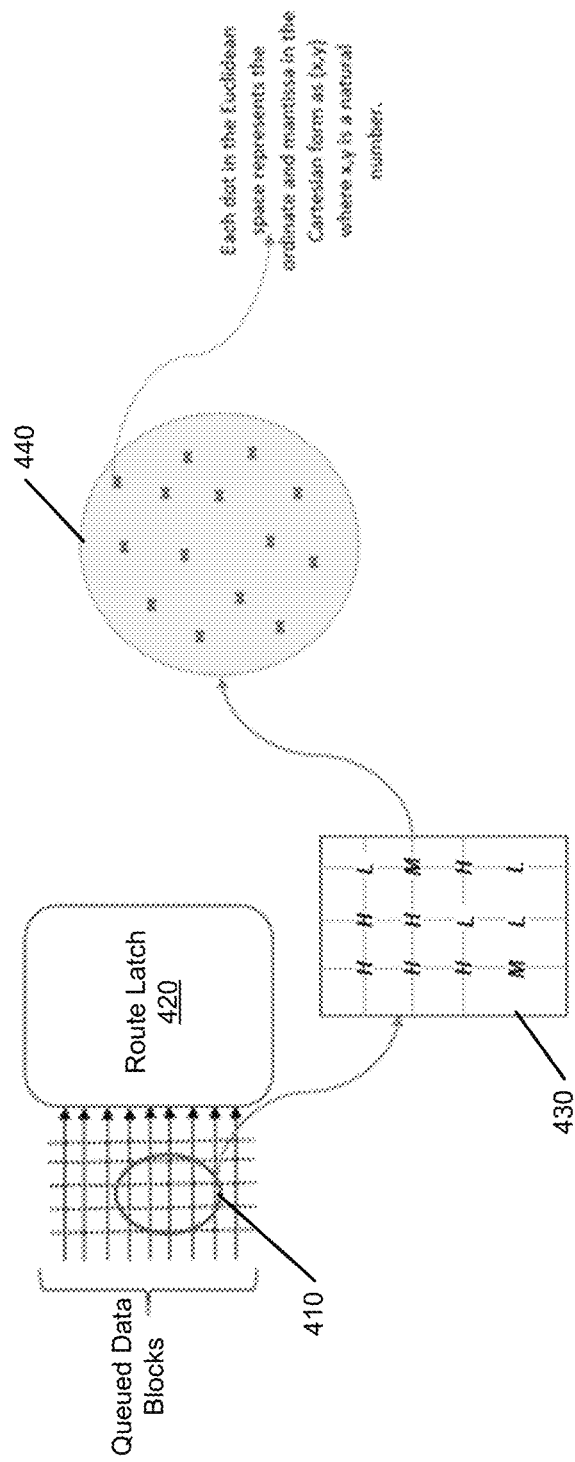
FIG. 4 is a diagram illustrating a derivation of a Euclidean space according to one embodiment.

FIG. 4 is a diagram illustrating a derivation of a Euclidean space according to one embodiment. The Euclidean space (as described in more detail herein below) may be used to calculate the Euclidean distance of each of the data blocks (e.g., in a routing queue 430) to be backed up. That is, at queue 430, the Euclidean distance may be calculated for each data block in the queue 430 waiting for a latch permission to get routed onto the target device. The algorithm of FIG. 4 assumes the placement of the data blocks in queue 430 as a Euclidean space, where the row-column intersections of the queue 430 and data blocks can be considered as coordinates of the Euclidean space in a Cartesian form.

Referring to FIG. 4, the algorithm begins by reading header information of each of the data blocks or data packets to check the criticality or critical level (e.g., "H"—high, "M"—medium, or "L"—low) of the data block or data packet. Then, a weighted value corresponding to the criticality of the data block (which is assigned by priority weight evaluator 133, as previously described) can be used to calculate a Euclidean distance between the data block and a consecutive data block in queue 430. The resultant of the calculation can be used to decide a next immediate data block that has to be route latched at that instant point in time.

In more detail, consider a set of data blocks in queue 430 as a set $P=\{p_1, p_2, p_3, \ldots, p_n\}$, where $n \in N$ and the next immediate data block set may be denoted as $P'=\{p'_1, p'_2, p'_3, p'_n\}$. The weighted values corresponding to the criticality of the data blocks may be denoted as $W=\{w_1, w_2, w_3\}$ and the weighted values of the consecutive data blocks may be a set $W'=\{w'_1, w'_2, w'_3\}$. For any value in Euclidean space 440, a distance in Cartesian form would be given as follows:

$$E_d = \sqrt{\sum_{i,j=1}^{n} |(p_i - p'_j)|^2} \text{ where } \{i, j, k, m \in N\}$$

Here, if there are existing dependent data blocks that are being streamed to the target device, then the dependent data blocks can be determined using the header information on the data packet or data block, and the minimum Euclidean distance from the Euclidean distances of the dependent blocks being streamed is taken as the final Euclidean distance. That is:

$$E_{d(dependent\ blocks)} = \min(E_{d(individual\ data\ blocks)})$$

In this case, the weighted values corresponding to the critical data blocks are considered. Thus, the values from the set of W and W' may be considered and the Euclidean points may be modified to have a dot product of the sequence in queue 430 and the weighted value of each of the data blocks. Accordingly, the Euclidean distance may now be represented as follows:

$$E_{dw} = \sqrt{\sum_{i,j=1}^{n} |(p_i \cdot w_k - p'_j \cdot w_m)|^2} \text{ where } \begin{Bmatrix} i, j, k, m \in N \\ 0 < k < 4 \\ 0 < m < 4 \end{Bmatrix}$$

However, due to internal fragmentation for example, there may be a variable sized blocks. These blocks may not be regular multiple of integers and there may be blocks with a slack space that are considerably empty due to the internal fragmentation. In such cases, it is not feasible to use the same equation described above to allocate a critical weight and allot a stream to the target device on priority. Thus, the equation would need to consider the slack space also, which is a well-defined numerical in terms of positive integer. Hence, the equation can be as follows:

$$E_{dw} = \sqrt{\sum_{i,j=1}^{n} |(p_i \cdot (w_k \cdot S_k) - p'_j \cdot (w_m \cdot S_m)|^2} \text{ where } \begin{Bmatrix} i, j, k, m \in N \\ 0 < k < 4 \\ 0 < m < 4 \end{Bmatrix}$$

With the modified Euclidean distance, each iteration of the Euclidean distance can result in a nearest possible data block, which corresponds to the most critical data block and a positive slack space. The consideration here, for example, is when there is a variable sized block having a zero slack space or NULL value due to fragmentation. In this case, the value may be multiplied with the weighted value and the dot product may be evaluated to obtain a final Euclidean distance (i.e., the priority). In this way, the evaluation and slack space consideration would ensure that the data block size is also considered along with the data criticality to prioritize the data blocks for target device streams. Such consideration would make sure that the data blocks, which are critical but with the zero slack space, are given the least priority. In some embodiments, this may be repeated and determined for each weighted value of criticality and every data block in the queue 430 for consecutive instant of time, thereby resulting in a prioritization with respect to the critical data blocks.

Figure 5:
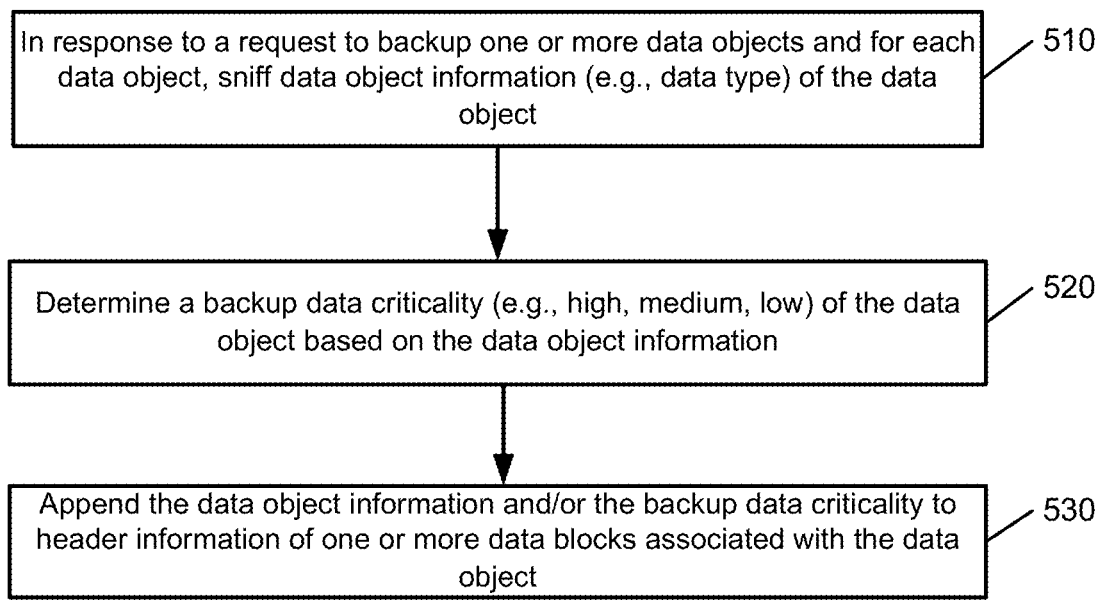
FIG. 5 is a flow diagram illustrating a method of appending a data criticality to data block header information according to one embodiment.

FIG. 5 is a flow diagram illustrating a method of appending a data criticality to data block header information according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by priority enforcer 131 of FIG. 2.

Referring to FIG. 5, at block 510, in response to a request to backup one or more data objects and for each data object, the processing logic sniffs data object information (e.g., data type) of the data object. At block 520, based on the data object information, the processing logic determines a backup data criticality (e.g., high, medium, low) corresponding to the data object. At block 530, the processing logic appends the data object information and/or the data criticality to header information of one or more data blocks associated with the data object.

Figure 6:
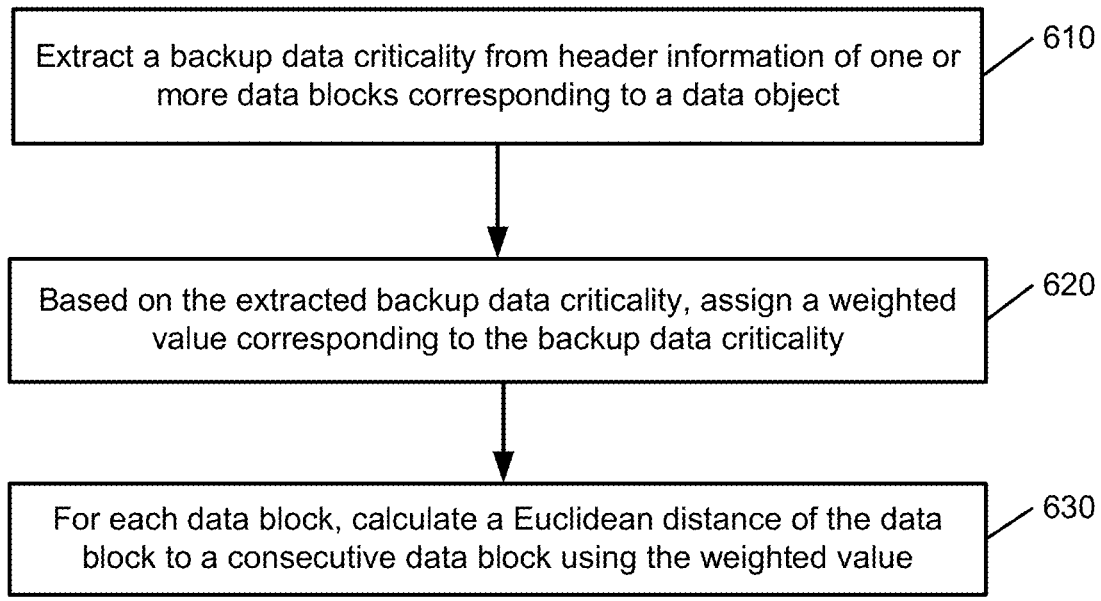
FIG. 6 is a flow diagram illustrating a method for block-level data prioritization during a backup operation according to one embodiment.

FIG. 6 is a flow diagram illustrating a method for block-level data prioritization during a backup operation according to one embodiment. Process 600 may be performed by processing logic that includes hardware (e.g. circuitry, dedicated logic, etc.), software (e.g., embodied on a non-transitory computer readable medium), or a combination thereof. For example, process 600 may be performed by priority weight evaluator 133, dependent block evaluator 134, Euclidean distance calculator 132, block sorter 135, stream buffer 136, or a combination thereof.

Referring to FIG. 6, at block 610, the processing logic extracts a backup data criticality from header information of one or more data blocks corresponding to a data object. At block 620, based on the extracted backup data criticality, the processing logic assigns a weighted value corresponding to the backup data criticality. At block 630, for each data block, the processing logic calculates a Euclidean distance of the data block to a consecutive data block using the weighted value.

In the foregoing embodiments of the invention, data blocks can be prioritized based on the criticality and time. Due to priority streaming, if the critical data block is written to the target device (e.g., storage system 104 of FIG. 1) first, data loss may be countered to some extent. Moreover, RPO for critical data paths can be prioritized first, thereby leading to better RPO. Also, data types and its criticality can be appended as part of header information. Due to block level prioritization, the solution ensures service-level agreement (SLA) metrics are further optimized and honored for customers.

Note that some or all of the components as shown and described above (e.g., components 131-136 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
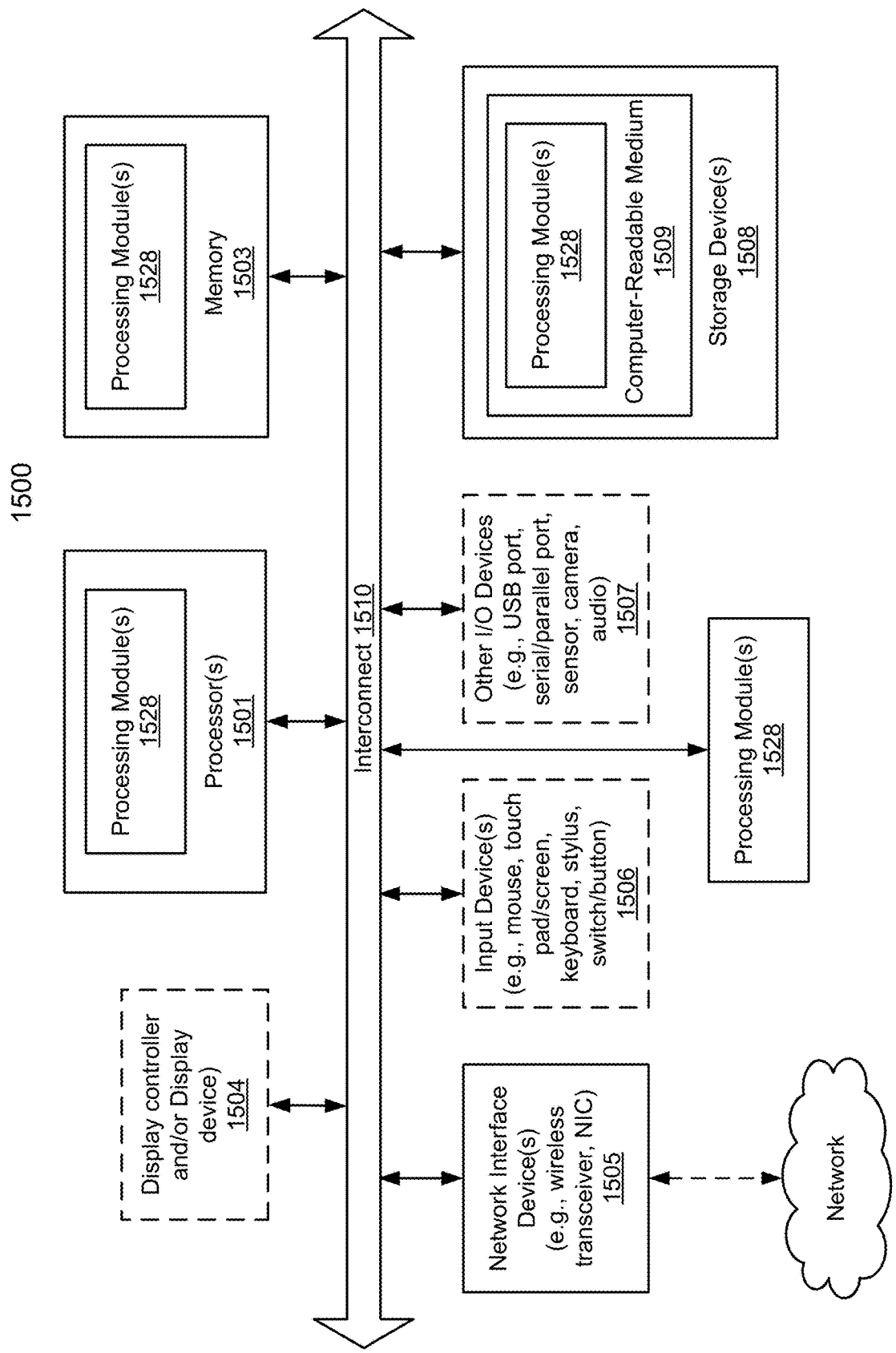
FIG. 7 is a block diagram illustrating a data processing system according to one embodiment.

FIG. 7 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 131-136 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for block-level data prioritization during a backup operation, the method comprising:
for each data block of a plurality of data blocks in a queue,
extracting a backup data criticality from header information of the data block;
based on the extracted backup data criticality, assigning a weighted value corresponding to the backup data criticality; and
calculating a distance between the data block and a consecutive data block of the data block based on the weighted value corresponding to the backup data criticality, wherein calculating the distance between the data block and the consecutive data block of the data block comprises obtaining a dot product of the weighted value corresponding to the backup data criticality and a sequence of the data block in the queue; and
sorting the plurality of data blocks by selecting a nearest and most critical data block to be routed for backup based on the calculated distance between each data block and the consecutive data block of the data block.

2. The method of claim 1, further comprising prior to extracting the backup data criticality from the header information of the data block,
sniffing data object information of a data object;
determining the backup data criticality based on the data object information; and
appending the backup data criticality to the header information of the data block.

3. The method of claim 1, further comprising evaluating the plurality of data blocks to identify at least one dependent data block associated with a parent block, wherein the plurality of data blocks comprise the parent block and the at least one dependent data block.

4. The method of claim 1, further comprising
routing the sorted data blocks to a stream buffer in a concurrent fashion for streaming operations.

5. The method of claim 2, wherein the data object information includes a data type.

6. A non-transitory machine-readable medium having instructions stored therein, which when executed by a processor, cause the processor to perform operations, the operations comprising:
for each data block of a plurality of data blocks in a queue,
extracting a backup data criticality from header information of the data block;
based on the extracted backup data criticality, assigning a weighted value corresponding to the backup data criticality; and
calculating a distance between the data block and a consecutive data block of the data block based on the weighted value corresponding to the backup data criticality, wherein calculating the distance between the data block and the consecutive data block of the data block comprises obtaining a dot product of the weighted value corresponding to the backup data criticality and a sequence of the data block in the queue; and
sorting the plurality of data blocks by selecting a nearest and most critical data block to be routed for backup based on the calculated distance between each data block and the consecutive data block of the data block.

7. The non-transitory machine-readable medium of claim 6, wherein the operations further comprise prior to extracting the backup data criticality from the header information of the data block,
sniffing data object information of a data object;
determining the backup data criticality based on the data object information; and
appending the backup data criticality to the header information of the data block.

8. The non-transitory machine-readable medium of claim 6, wherein the operations further comprise evaluating the plurality of data blocks to identify at least one dependent data block associated with a parent block, wherein the plurality of data blocks comprise the parent block and the at least one dependent data block.

9. The non-transitory machine-readable medium of claim 6, wherein the operations further comprise:
routing the sorted data blocks to a stream buffer in a concurrent fashion for streaming operations.

10. The non-transitory machine-readable medium of claim 7, wherein the data object information includes a data type.

11. A data processing system, comprising:
a processor; and
a memory coupled to the processor to store instructions, which when executed by the processor, cause the processor to perform operations, the operations including:
for each data block of a plurality of data blocks in a queue,
extracting a backup data criticality from header information of the data block;
based on the extracted backup data criticality, assigning a weighted value corresponding to the backup data criticality; and
calculating a distance between the data block and a consecutive data block of the data block based on the weighted value corresponding to the backup data criticality, wherein calculating the distance between the data block and the consecutive data block of the data block comprises obtaining a dot product of the weighted value corresponding to the backup data criticality and a sequence of the data block in the queue; and
sorting the plurality of data blocks by selecting a nearest and most critical data block to be routed for backup based on the calculated distance between each data block and the consecutive data block of the data block.

12. The data processing system of claim 11, wherein the operations further include prior to extracting the backup data criticality from the header information of the data block,
sniffing data object information of a data object;
determining the backup data criticality based on the data object information; and
appending the backup data criticality to the header information of the data block.

13. The data processing system of claim 11, wherein the operations further include evaluating the plurality of data blocks to identify at least one dependent data block associated with a parent block, wherein the plurality of data blocks comprise the parent block and the at least one dependent data block.

14. The data processing system of claim 11, wherein the operations further include:

routing the sorted data blocks to a stream buffer in a concurrent fashion for streaming operations.

\* \* \* \* \*